(12) United States Patent
Seo et al.

(10) Patent No.: US 8,037,497 B2
(45) Date of Patent: Oct. 11, 2011

(54) FAST CHANNEL SWITCHING METHOD AND APPARATUS FOR DIGITAL BROADCAST RECEIVER

(75) Inventors: Jeong Wook Seo, Daegu Metropolitan (KR); Wei Jin Park, Seoul (KR); Young Jun Jung, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 652 days.

(21) Appl. No.: 11/854,466

(22) Filed: Sep. 12, 2007

(65) Prior Publication Data

US 2008/0072259 A1 Mar. 20, 2008

(30) Foreign Application Priority Data

Sep. 18, 2006 (KR) .................. 10-2006-0090026

(51) Int. Cl.
*H04N 5/445* (2006.01)
*H04N 7/173* (2006.01)
*H04N 7/16* (2011.01)
(52) U.S. Cl. ................ 725/54; 725/120; 725/151
(58) Field of Classification Search .............. 725/131, 725/151, 54, 120
See application file for complete search history.

(56) References Cited

U.S. PATENT DOCUMENTS

2006/0085828 A1* 4/2006 Dureau et al. ............. 725/100
2006/0109380 A1* 5/2006 Salomons ................... 348/565

FOREIGN PATENT DOCUMENTS

| JP | 2001-309258 | 11/2001 |
| JP | 2004-260812 | 9/2004 |
| JP | 2006-074241 | 3/2006 |

OTHER PUBLICATIONS

Digital Video Broadcasting (DVB); DVB-H Implementation Guidelines, ETSI TR 102 377 V1.2.1, (Nov. 2005).*
Digital Video Broadcasting (DVB); IP Datacast over DVB-H: Use Cases and Services, ETSI TR 102 473 V1.1.1, (Apr. 2006).*
Digital Video Broadcasting (DVB); IP Datacast over DVB-H: Electronic Service Guide (ESG), ETSI TS 102 471 V1.1.1, (Apr. 2006).*

* cited by examiner

*Primary Examiner* — James R Sheleheda
(74) *Attorney, Agent, or Firm* — The Farrell Law Firm, P.C.

(57) ABSTRACT

A fast channel switching method and apparatus for a digital broadcast receiver that can reduce a channel switching delay caused by limitations in real time broadcasting systems is provided. A fast channel switching method of the present invention includes simultaneously receiving broadcast signals of a first service channel and a second service channel; presenting the broadcast signal of the first service channel through a player; and circular-buffering the broadcast signal of the second service channel. A digital broadcast receiver using a fast channel switching technique of the present invention can buffer an adjacent service channel while serving the current service channel such that the buffered broadcast signal is output when the adjacent channel is selected, thereby reducing a channel switching delay.

12 Claims, 10 Drawing Sheets

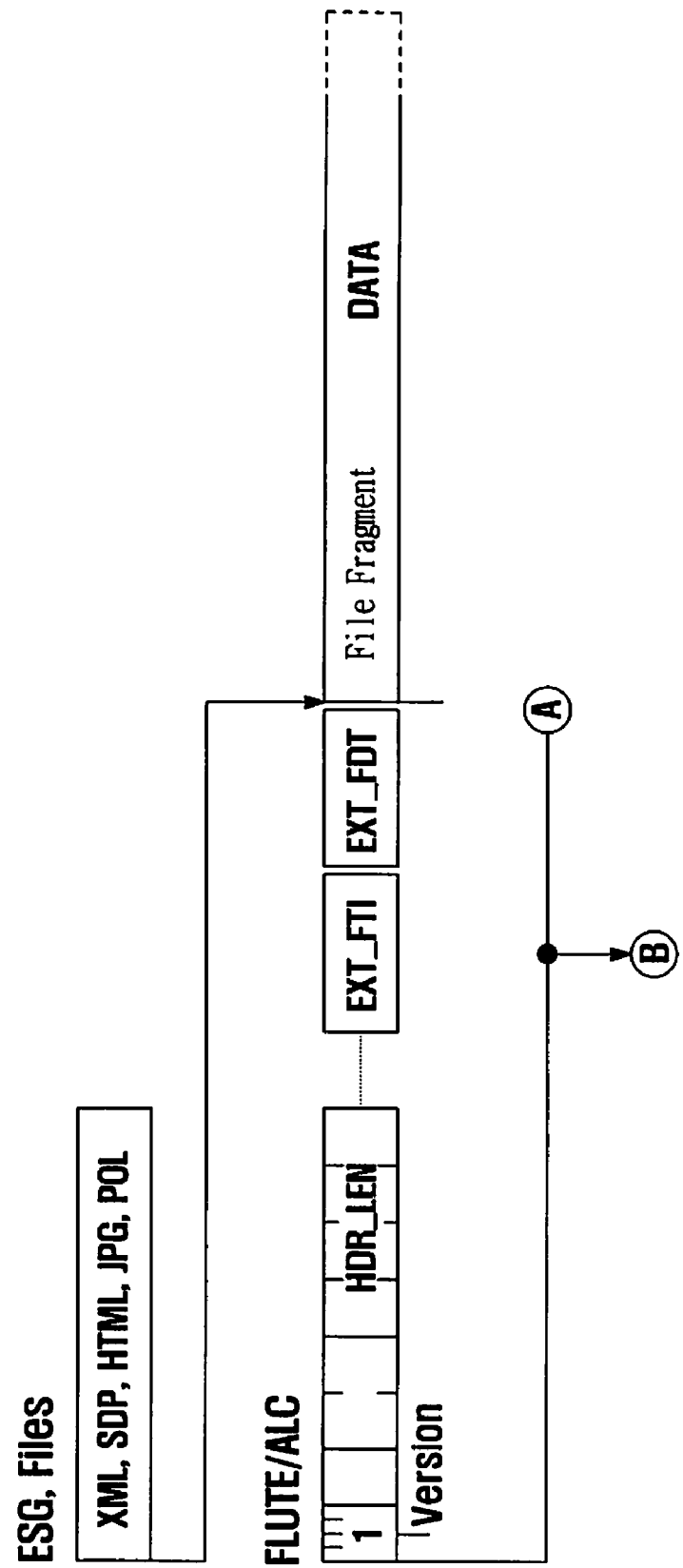

```
table_id's :
  0x00 : PAT
  0X01 : CAT
  0x02 : PMT
  0x06 - 0x37 : reserved
  0x38 - 0x3F : 13818-6 (DSM-CC)
  0x3E : MPE
  0x40 - 0xEE : private
  0x40 : NIT
  0x41 : NIT other
  0x42 : SDT
  0x43 : SDT other
  0x4c : INT
  0x4e : EIT
  0x78 : MPE-FEC
  0xFF : forbidden PID's :
  0x000 : PAT
  0x001 : CAT
  0x002 : TSDT
  0x003 : - 0X00F : reserved
  0x010 : NIT
  0x011 : SDT, BAT (,ST)
  0x012 : EIT
  0x013 : RST
  0x014 : TDT, TOT (,ST)
  0x015 : (SFN-)MIP
  0x016 - 0X01B : reserved
  0x01C : Inband Signalling
  0x01D : Measurement
  0x01E : DIT
  0x01F : SIT
  0xXXX : PMT
  0xXXX : DSM-CC, MPE
  0x1FFF : NULL PACKET
```

FAST CHANNEL SWITCHING METHOD AND APPARATUS FOR DIGITAL BROADCAST RECEIVER

PRIORITY

This application claims priority to an application entitled "FAST CHANNEL SWITCHING METHOD AND APPARATUS FOR DIGITAL BROADCAST RECEIVER" filed in the Korean Intellectual Property Office on Sep. 18, 2006 and assigned Serial No. 2006-0090026, the contents of which are incorporated herein by reference.

BACKGROUND OF THE INVENTION

1. Field of the Invention

The present invention relates to a digital broadcast receiver and, in particular, to a fast channel switching method and apparatus for a digital broadcast receiver that can reduce a channel switching delay caused by limitations in real time broadcasting systems.

2. Description of the Related Art

A digital broadcast receiver is an apparatus that restores original digital data from a broadcast signal transmitted by a broadcasting station. The digital data is coded and modulated so as to be broadcast in the form of a broadcast signal by the broadcasting station. The digital broadcast receiver demodulates and decodes the broadcast signal for restoring the original digital data. The digital broadcast receiver is provided with a tuner, a demodulator, and a decoder.

Digital broadcast systems are classified into a digital multimedia broadcast (DMB) system and a digital video broadcasting (DVB) system. These digital broadcast systems provide a plurality of service channels in a frequency band, and each service channel is structured with multiplexed sub-channels of video, audio, and program information data.

The digital broadcast receiver scans the service channels such that a subscriber can select one of the scanned service channels and switch to another service channel at will.

In digital broadcasting, however, the digital data is highly compressed and thus it takes a considerable amount of time for a screen to become stable after switching service channels, unlike in analog broadcasting. In the case of DVB, data burst repeats for a period of 1 to 4 seconds and thus the screen shows nothing before the data burst is completely buffered after switching the service channels. This switching delay is inconvenient to subscribers.

In the case of DVB-handheld (DVB-H), there are at least 4 basic channels: main channel, electronic service guide (ESG) channel, entitlement management message (EMM) channel, and picture in picture (PIP) channel. In order to reduce the channel switching delay, a DVB-H receiver buffers signals transmitted through the channels adjacent to the main channel. In order to enable buffering of the signals on the adjacent channels, a total of 12 Megabytes (2 Megabytes per channel) are required. However, since the ESG is not always received, the memory capacity for the ESG is wasted.

SUMMARY OF THE INVENTION

The present invention has been made in an effort to solve the above problems, and it is an object of the present invention to provide a fast switching method and apparatus for a digital broadcast receiver that are capable of reducing channel switching delay by buffering recent frames in channels adjacent to a current service channel.

It is another object of the present invention to provide a fast switching method and apparatus for a digital broadcast receiver that are capable of improving the memory efficiency by utilizing adjacent channels as ESG, PIP, and buffering channels.

In accordance with an aspect of the present invention, the above and other objects are accomplished by a fast channel switching method for a digital broadcast receiver. The fast channel switching method includes simultaneously receiving broadcast signals of a first service channel and a second service channel; presenting the broadcast signal of the first service channel through a player; and circular-buffering the broadcast signal of the second service channel.

In accordance with another aspect of the present invention, the above and other objects are accomplished by a fast channel switching apparatus for a digital broadcast receiver. The fast channel switching apparatus includes a tuner for simultaneously receiving broadcast signals of a first service channel and a second service channel; a player for playing the broadcast signal of the first service channel; and a memory for circular-buffering the broadcast signal of the second service channel.

BRIEF DESCRIPTION OF THE DRAWINGS

The above and other objects, features and advantages of the present invention will be more apparent from the following detailed description in conjunction with the accompanying drawings, in which:

FIGS. 2A through 2F are diagrams illustrating a data format of a service channel in DVB-H system operating with the fast switching method according to the present invention;

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A digital broadcast receiver for using a fast switching method and apparatus of the present invention can be implemented with a digital broadcast receive function, mobile communication function, camera function, and information process function.

Figure 1:
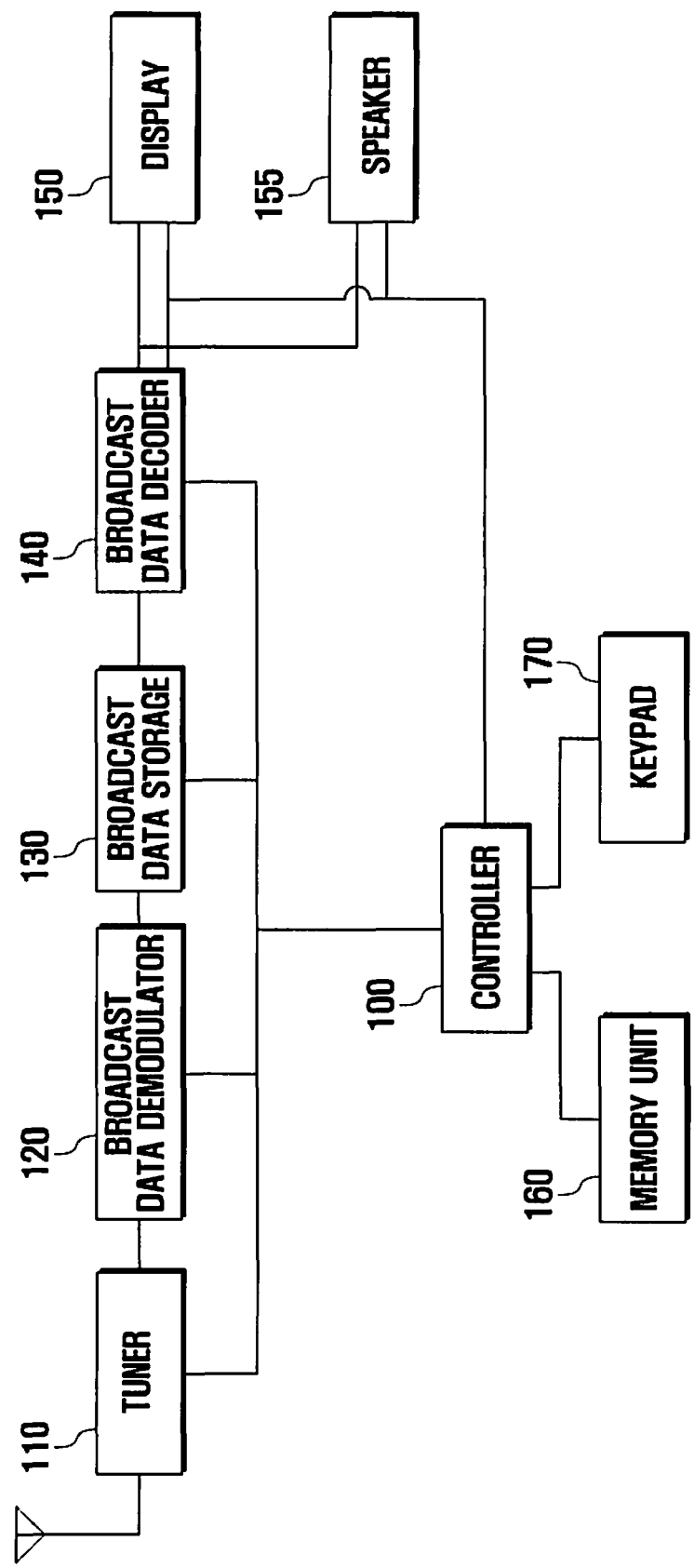
FIG. 1 is a block diagram illustrating a configuration of a digital broadcast receiver for using a fast switching method and apparatus according to the present invention.
Figure 2A:
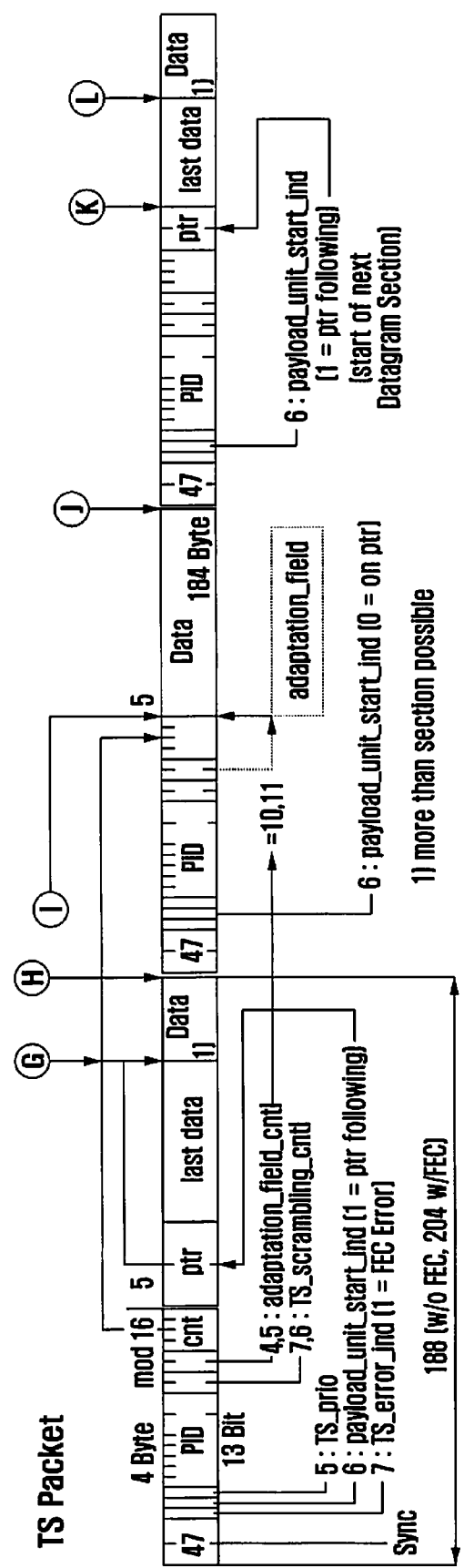
Figure 2B:
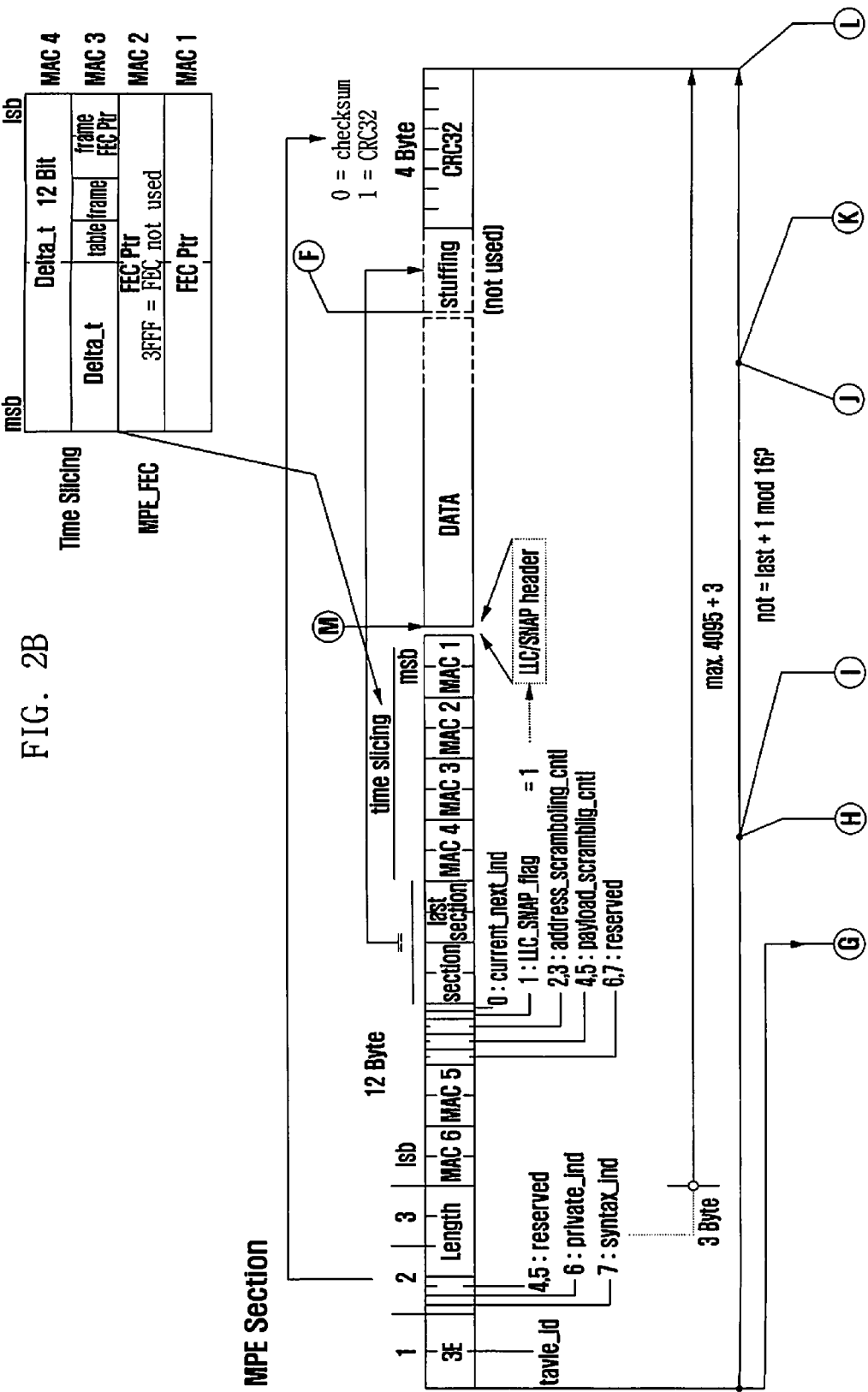
Figure 2C:
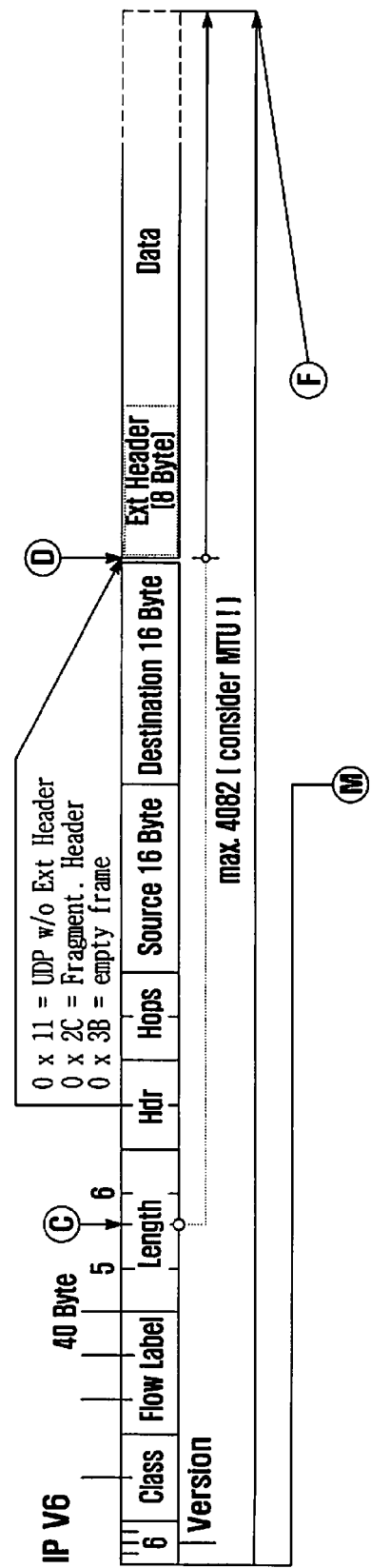
Figure 2D:
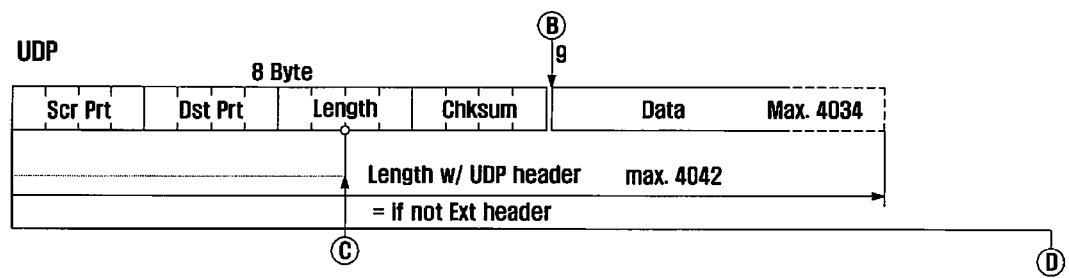
Figure 2F:
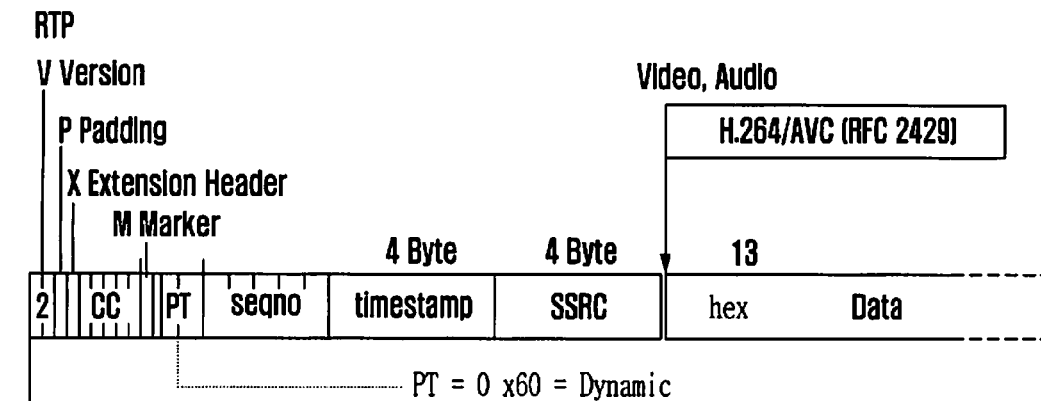

FIG. 1 is a block diagram illustrating a configuration of a digital broadcast receiver for using a fast switching method and apparatus according to the present invention. By way of example, the digital broadcast receiver described herein is a DVB-H-based digital broadcast receiver.

Referring to FIG. 1, the digital broadcast receiver includes a controller 100, tuner 110, broadcast data demodulator 120, broadcast data storage 130, broadcast data decoder 140, display 150, speaker 155, memory unit 160, and keypad 170.

The controller 100 controls the overall operations of the digital broadcast receiver. The keypad 170 generates key signals according to a user's key manipulation and transfers the key signals to the controller 100. The keypad 170 allows a user to input commands for channel selection, channel switching, playback, etc. The controller 100 is provided with a channel switching controller for switching service channels and an ESG manager for receiving ESG, determining the expiration of the ESG, and updating the ESG if required.

The memory unit 160 includes a program memory for storing software programs for controlling the operations of the digital broadcast receiver and a data memory for storing the data generated while the software programs operate. The program memory stores programs for buffering signals in the adjacent channel so as to facilitate the channel switching. The controller 100 analyzes the key signal input through the keypad 170 to control the operation of the digital broadcast receiver. The controller 100 controls the operation modes, i.e. playback, recording, channel selection, and channel switching.

The tuner 110 sets a physical frequency channel for the service channel selected by the user under the control of the controller 100 so as to receive the broadcast signals through the physical channel. The broadcast data demodulator 120 demodulates the broadcast signals received through the tuner 110. The broadcast data demodulator 120 can modulate broadcast signals received through a plurality of service channels of the physical frequency channel. The broadcast data storage 130 buffers the broadcast signals received through a current service channel and other service channels adjacent to the current service channel. The broadcast data decoder 140 decodes the broadcast signals of the current service channel into the broadcast data. The broadcast data decoder 140 includes a video decoder and audio decoder for separately decoding video signals and audio signals contained in the broadcast signals for output through the display 150 and the speaker 155, respectively.

The broadcast data demodulator 120 and the broadcast data decoder 140 can be adaptively implemented according to the digital broadcasting system. The digital broadcasting can be classified into DMB and DVB systems, and the DVB is classified into DVB-terrestrial (DVB-T) and DVB-handheld (DVB-H). The broadcast data of the DMB and DVB systems are structured in the form of Motion Picture Experts Group 2 transport stream (MPEG2-TS), and the MPEG2-TS format is implemented as a packet stream, each packet having a packet header and a payload. The packet header contains a packet identifier (PID) for distinguishing the service channels such that the digital broadcast receiver chooses a service channel using the PID information. The payload is filled with the broadcast data in the DMB and DVB-T system, but with IP information and broadcast data in the DVB-H.

In the cases of DVB-T and DMB, the broadcast data demodulator 120 is implemented with a demodulator for the service channel data, and the broadcast data decoder 140 is implemented with a demultiplexer, and video and audio decoders. In the case of DVB-H, however, the broadcast data demodulator 120 includes a demodulator for service channel data, PID filter for selecting the service channel data selected by the user, and demodulation controllers for controlling the operations of the demodulator and the tuner 110 under the controller 100. Also, the broadcast data decoder 140 has a protocol processing unit for supporting protocols including IP, and video and audio decoders.

The digital broadcast receiver according to the present invention buffers the signals of contiguous channels of the current service channel or preset channels and starts playback, upon selecting a channel, of the selected channel through the channel switching, whereby it is possible to reduce the channel switching delay. That is, the digital broadcast receiver buffers contiguous or preset channels of the current service channel while playing signals of the current service channel so as to switch the service channels seamlessly.

The service channel buffering can be implemented in various manners. In one implementation, if the current channel is changed by the channel switching, the channels to be buffered are automatically set.

By adopting the above channel switching method, the channel switching delay can be dramatically reduced when the user selects another channel while watching a current service channel or selects adjacent channels one-by-one, since the buffered signals of the selected channel can be output without any time delay.

FIGS. 2A through 2F are diagrams illustrating a data format of a service channel in the DVB-H system.

As shown in FIGS. 2A through 2F, the DVB-H data are structured in the form of MPEG2-TS. The total length of each TS packet is 188 bytes consisting of a 4-byte packet header and an 184-byte payload. The packet header includes information on a packet sync and PID. The PID is a channel identifier and can be used for identifying data contained in the payload. The payload consists of multi protocol encapsulation (MPE) sections. Each MPE section includes a table identifier (table_ID), MPE forward error correction (MPE-FEC) information for correcting errors of the received data, and information for slicing the received data in time. Each MPE contains at least one IP datagram. In FIGS. 2A through 2F, IPv6 datagram is depicted as an example. The IP datagram includes IP version information, source IP address, and destination address. The IP datagram consists of user datagram protocol (UDP) units, and each UDP unit includes port addresses of the transmitter and receiver (Scr Prt and Dst Prt). The UDP unit contains FLUTE/ALC units and a real time transport protocol (RTP) unit. The FLUTE/ALC unit includes the ESG and files, and the RTP unit includes audio and video data.

Figure 3:
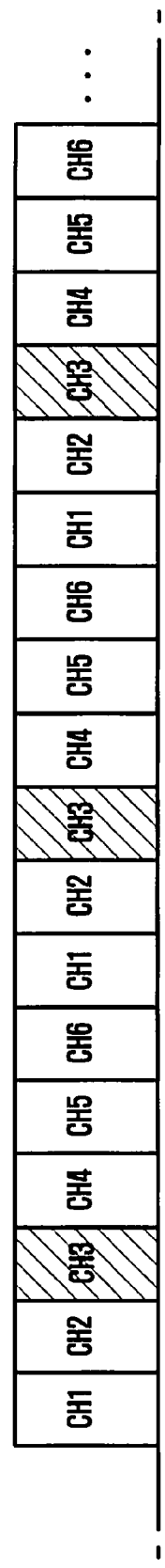
FIG. 3 is a diagram illustrating a channel format in which service channels are multiplexed in a time slicing scheme for the DVB-H system of FIGS. 2A through 2F.

FIG. 3 is a diagram illustrating a channel format in which service channels are multiplexed in a time slicing scheme for the DVB-H system of FIGS. 2A through 2F.

The DVB-H transmitter and receiver turn the power on at timeslots for the current service channel and turn the power off at other timeslots such that it is possible to reduce power consumption. As shown in FIG. 3, 6 service channels are multiplexed in single time duration and channel 3 (CH3) is selected as a current service channel. In this case, the timeslot represented by the channel 3 is a burst-on time and the timeslots represented by channel 1, channel 2, and channel 4 to channel 6 (CH1, CH2, and CH4 to CH6) become burst-off times. The broadcast data of the service channels are transmitted at the respective timeslots for corresponding service channels. When using the time slicing scheme, the digital broadcast receiver can predict the burst time of the current service channel and the burst times of other service channels. For example, if the burst time of each channel is 1 second, the broadcast data of the current service channel is received every 6 seconds. Since the digital broadcast receiver also knows the transmission order of service channels, it is possible to receive the broadcast data at the timeslot assigned for the current service channel. In the present invention, the digital broadcast receiver buffers the broadcast signals of preset service channels while processing the broadcast signals of the current service channel for playback.

For example, if channel 2 is selected while playing channel 3, the digital broadcast receiver outputs the broadcast signals of the channel that was buffered while playing the broadcast signals of channel 3 such that it is possible to seamlessly switch the service channel from CH3 to CH2 without delay.

Figure 4A:
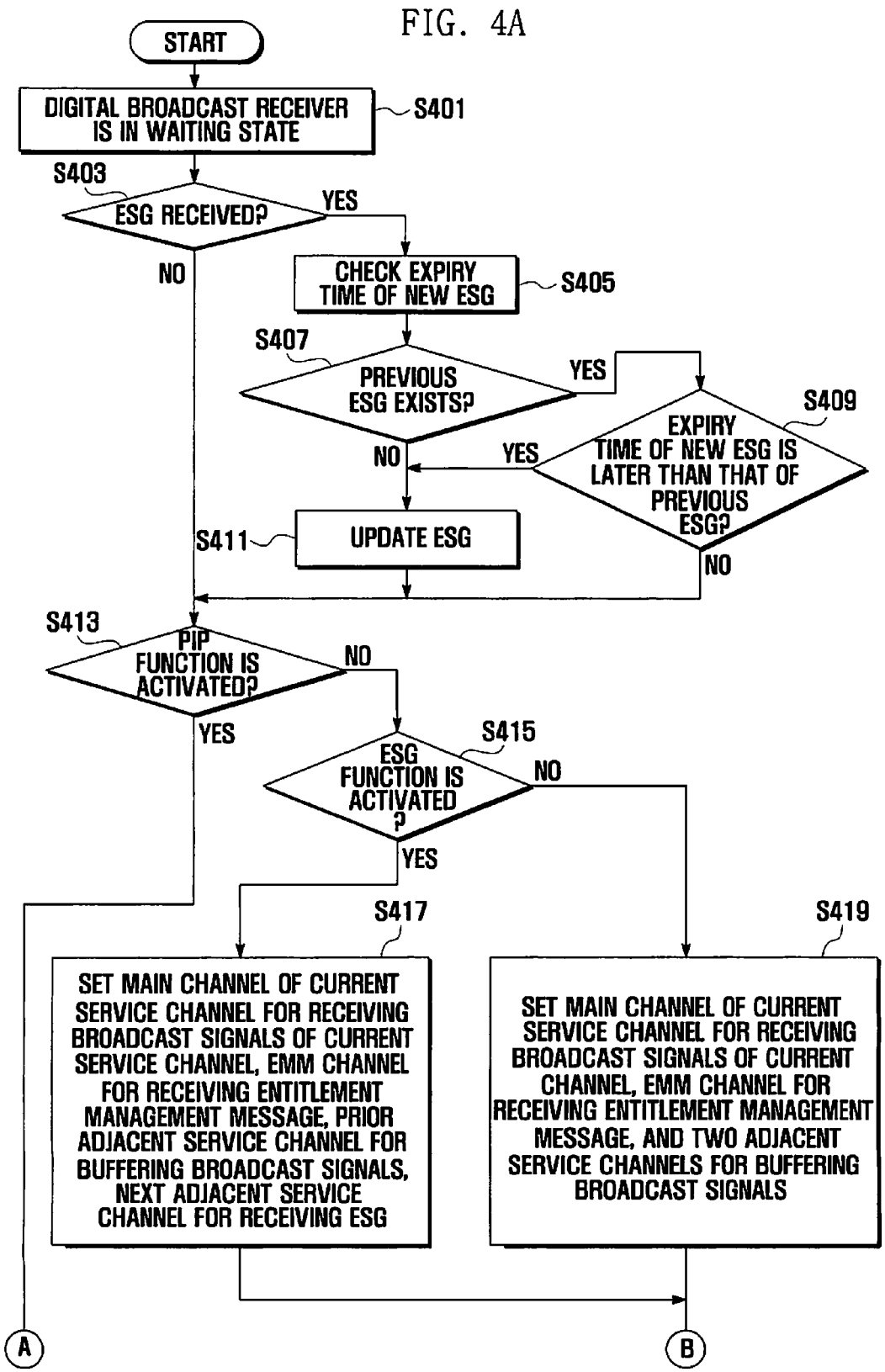
FIGS. 4A and 4B is a flowchart illustrating a fast channel switching method for a digital broadcast receiver according to the present invention.
Figure 4B:
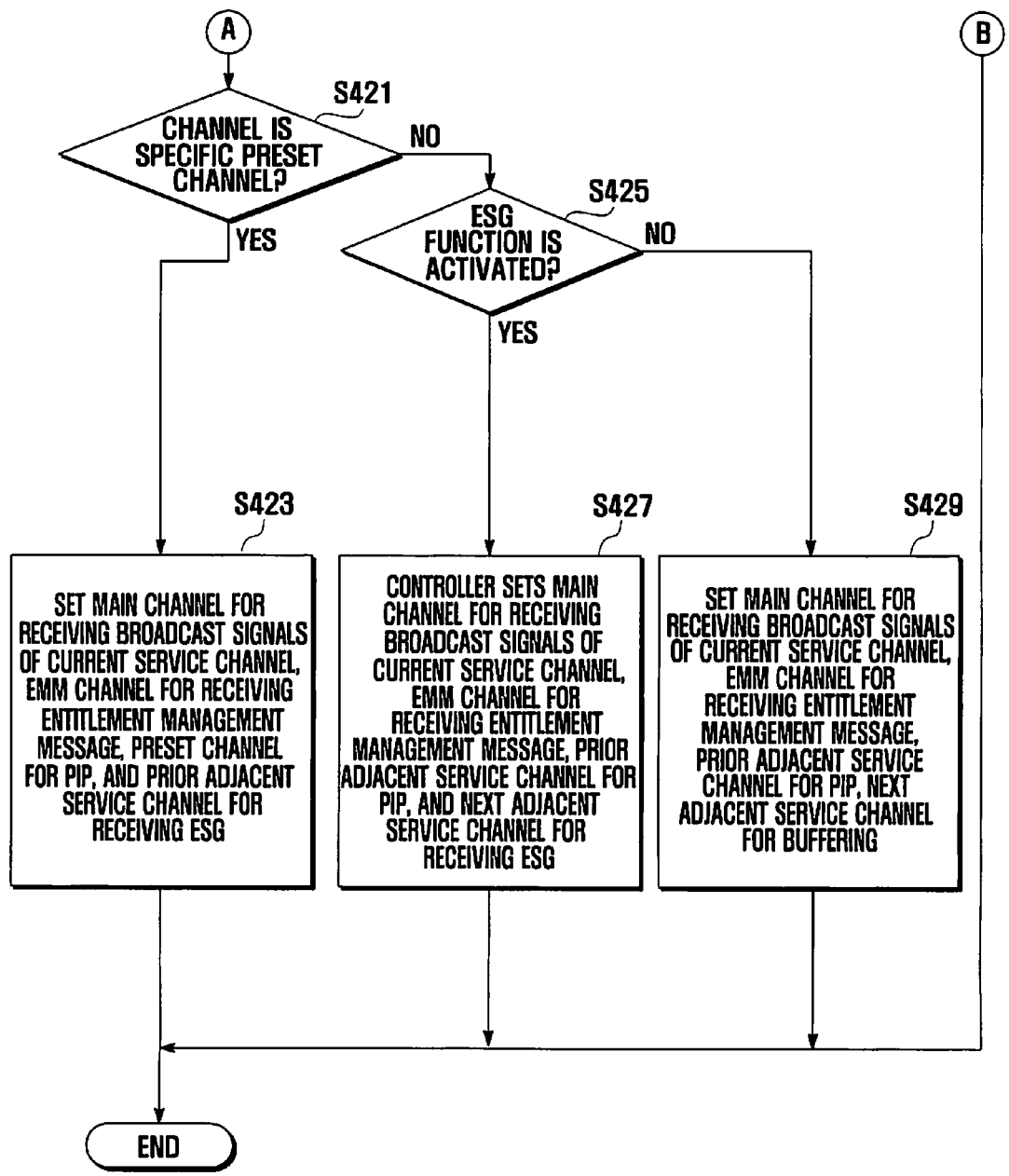

FIGS. 4A and 4B is a flowchart illustrating a fast channel switching method for a digital broadcast receiver according to the present invention.

The fast channel switching method according to the present invention is described in consideration of the following assumptions.

1) Signals on the main channel and EMM channel should be continuously received.
2) A PIP function should be considered.
3) The channel switching delay should be reduced with a storage limit of 8 Megabytes.
4) Adjacent channels of the current service channel are buffered while playing the current service channel.
5) An ESG is received periodically (for example, 1 time per week)

In the fast channel switching method, the digital broadcast receiver constantly receives the signals on the main channel and EMM channel; selects a prior or next adjacent service channel of the current service channel for PIP function; buffers, when one of the adjacent service channels is selected for the PIP function, only the other adjacent channels; and borrows the EPG channel for a buffering channel when the EPG is not received.

Referring to FIGS. 4A and 4B, while the digital broadcast receiver is in a waiting state (S401), the controller 100 (the ESG manager) of the digital broadcast receiver determines if an ESG signal is received (S403). If an ESG signal is received, the controller 100 determines an expiration time of the newly received ESG (S405), and then determines whether a previous ESG exists (S407). If a previous ESG exists, the controller 100 determines if the expiration time of the newly received ESG is later than that of the previous ESG (S409). The expiration time of the ESG is contained in a bootstrap session FDT of the FLUTE/ALC unit (see FIGS. 2A through 2F) as a UTC value, which is a property value for the expiration time. A bootstrap-specification includes information on a fixed IP with which the ESG is received.

If a previous ESG expiration time does not exist or is prior to that of the currently received ESG, the controller 100 updates the ESG with the newly received ESG (S411). After updating the ESG, the controller determines if a PIP function is activated (S413). If a PIP function is not activated, the controller determines if the ESG function is activated (S415). If the PIP function is not activated and the ESG function is activated, the controller 100 sets the main channel of the current service channel for receiving the broadcast signals of the current service channel, the EMM channel for receiving an entitlement management message, a prior adjacent service channel for buffering broadcast signals, and a next adjacent service channel for receiving the ESG. The broadcast signal of the prior adjacent service channel is buffered in the memory (S417).

If both PIP and ESG functions are not activated, the controller sets the main channel of the current service channel for receiving the broadcast signals of the current channel, the EMM channel for receiving an entitlement management message, and two adjacent service channels for buffering broadcast signals received through their main channels (S419). The entitlement management message is used for identifying a pay TV subscriber and is transmitted to the receiver with ciphered receivable channel information.

If the PIP function is activated at step S413, the controller 100 determines if a PIP channel is a specific preset channel rather than one of the adjacent channels (S421).

If a PIP channel is a specific preset channel, the controller 100 sets the main channel for receiving the broadcast signals of the current service channel, the EMM channel for receiving the entitlement management message, the preset channel for PIP, and a prior adjacent service channel for receiving ESG (423).

If a PIP channel is not a specific preset channel at step S421, the controller 100 determines whether the ESG function is activated (S425). If the ESG function is activated, the controller sets the main channel for receiving the broadcast signals of the current service channel, the EMM channel for receiving the entitlement management message, a prior adjacent service channel for PIP, and a next adjacent service channel for receiving ESG (S427).

If it is determined that the ESG function is not activated at step S425, the controller 100 sets the main channel for receiving the broadcast signals of the current service channel, the EMM channel for receiving the entitlement management message, a prior adjacent service channel for PIP, and a next adjacent service channel for buffering (429).

The steps S417, S419, S423, S427, and S429 are performed in cooperation with a channel assigner which effectively assigns the channels for receiving the broadcast signals, EMM message, and ESG, and for buffering another channel.

As described above, a digital broadcast receiver using a fast channel switching technique of the present invention can buffer an adjacent service channel while serving the current service channel such that the buffered broadcast signal is output when the adjacent channel is selected, thereby enabling a reduced channel switching delay.

Also, a digital broadcast receiver using the fast channel switching technique exploits adjacent channels for receiving ESG and PIP and for buffering another service channel, thereby improving the memory utilization.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A fast channel switching method for a digital broadcast receiver, comprising:
    simultaneously receiving broadcast signals of a first service channel and a second service channel adjacent to the first service channel;
    playing the broadcast signal of the first service channel through a player;
    when an electronic service guide is not received, circular-buffering the broadcast signal of the second service channel while the broadcast signal of the first service channel is played; and
    when the electronic service is received, buffering an electronic service guide where the broadcast signal of the second service channel is circular-buffered.

2. The fast channel switching method of claim 1, further comprising:
    determining if a channel switching signal is input; and
    if a channel switching signal is input, playing the buffered broadcast signal of the second service channel.

3. A fast channel switching method for a digital broadcast receiver, comprising:
    updating an electronic service guide;

assigning channels on the basis of a result of updating the electronic service guide; and
playing a received broadcast signal of a first service channel, wherein assigning the channels comprises:
setting a main channel for receiving the broadcast signal of the first service channel;
setting an entitlement management message channel for receiving an entitlement management message;
determining if an electronic service guide is received;
if the electronic service guide is not received, circular-buffering a broadcast signal of a second service channel adjacent to the first service channel while the broadcast signal of the first service channel is played; and
if the electronic service guide is received, buffering the electronic service guide where the broadcast signal of the second service channel is circular-buffered.

4. The fast channel switching method of claim 3, wherein updating the electronic service guide comprises:
determining if a new electronic service guide is received;
determining if an old electronic service guide previously received exists;
if an old electronic service guide exists, determining if an expiration time of the new electronic service guide is later than an expiration time of the old electronic service guide; and
storing the new electronic service guide if no old electronic service guide exists or if the expiration time of the new electronic service guide is later than an expiration time of the old electronic service guide.

5. The fast channel switching method of claim 4, wherein updating the electronic service guide further comprises discarding the new electronic service guide if the old electronic service guide exists and the expiration time of the new electronic service guide is not later than the expiration time of the old electronic service guide.

6. The fast channel switching method of claim 3, wherein assigning channels further comprises:
determining if a picture-in-picture function is activated; and
if a picture-in-picture function is not activated and an electronic service guide is not received, setting a prior adjacent channel for buffering a broadcast signal of a second service channel.

7. The fast channel switching method of claim 6, wherein if a picture-in-picture function is not activated and an electronic service guide is received, assigning channels further comprises setting the prior adjacent channel for buffering the broadcast signal of the second service channel, and a next adjacent channel for receiving the electronic service guide.

8. The fast channel switching method of claim 6, wherein if a picture-in-picture function is activated and an electronic service guide is not received, assigning channels further comprises setting the prior adjacent channel for the picture-in-picture function, and a next adjacent channel for buffering the broadcast signal of the second service channel.

9. The fast channel switching method of claim 6, wherein assigning channels further comprises:
if a picture-in-picture function is activated, determining if the picture-in-picture function is set for an adjacent channel; and
if the picture-in-picture function is set for an adjacent channel and an electronic service guide is received, setting the prior adjacent channel for the picture-in-picture function, and a next adjacent channel for receiving the electronic service guide.

10. The fast channel switching method of claim 6, further comprising:
determining if a channel switching signal is input; and
if the channel switching signal is input, playing the circular-buffered broadcast signal of the second service channel.

11. A fast channel switching apparatus for a digital broadcast receiver, comprising:
a tuner for simultaneously receiving broadcast signals of a first service channel and a second service channel adjacent to the first service channel;
a player for playing the broadcast signal of the first service channel;
a memory for circular-buffering the broadcast signal of the second service channel;
a controller for controlling the memory to circular-buffer, when an electronic service guide is not received, the broadcast signal of the second service channel while the broadcast signal of the first service channel is played and for including an electronic service guide manager; and
the electronic service guide manager, when the electronic service guide is received, for buffering an electronic service guide where the broadcast signal of the second service channel is circular-buffered,
wherein the player plays the circular-buffered broadcast signal of the second service channel if a channel switching signal is input.

12. A fast channel switching apparatus for a digital broadcast receiver, comprising:
an updater for updating an electronic service guide;
a player for playing the broadcast signal of the first service channel;
a channel assigner for assigning channels for receiving a broadcast signal of a first service channel, buffering a broadcast signal of a second service channel adjacent to the first service channel, activating a picture-in-picture function, and receiving the electronic service guide, according to whether the picture-in-picture function and electronic service guide function are activated, and which channel is set for the picture-in-picture function;
a memory for circular-buffering the broadcast signal of the second service channel;
a controller for controlling the memory to circular-buffer, when the electronic service guide is not received, the broadcast signal of the second service channel while the broadcast signal of the first service channel is played and for including an electronic service guide manager; and
the electronic service guide manager for buffering the electronic service guide, when the electronic service guide is received, where the broadcast signal of the second service channel is circular-buffered,
wherein the player plays the broadcast signal of the circular-buffered second service channel, if a channel switching signal is input.

* * * * *